United States Patent Office 2,805,130
Patented Sept. 3, 1957

2,805,130

PROCESS OF PRODUCING BORON HALIDES

John H. Wood, Troy, N. Y., assignor, by mesne assignments, to Olin Chemical Co., Inc., a corporation of Delaware No Drawing. Application August 2, 1954, Serial No. 447,379

4 Claims. (Cl. 23—205)

My invention relates to the preparation of boron halides.

Boron trihalides have been produced by the reaction of an alkaline earth metal halide with boric oxide at high temperatures, for example, the production of boron trifluoride by the reaction of boric oxide and calcium fluoride at about 1000° C. Boron halides have also been prepared by the reaction of boric oxide with halides of metals such as cobalt, antimony, mercury and silver. The latter process is disadvantageous because of the prohibitive cost of the particular metal halides employed.

I have found that boron trihalides are readily obtained by the reaction in the molten state of boric oxide with alkali metal halides. I have found, moreover, that when so obtained the boron trihalides are in a very high state of purity and do not contain such usual undesirable contaminants as phosgene. According to my invention, a mixture of boric oxide and an alkali metal halide are reacted in the molten state at a temperature of about 800 to 1000° C. to form boron trihalides. Preferably, for higher yields the boric oxide is pre-fused to remove water and prevent the reaction of water with the boron halide.

The boric oxide and alkali metal halide are used in a molar ratio of the oxide to metal halide of about 3.5–1 to 1. The reactants are heated in molten state at about 800 to 1000° C. for a period of time varying from a few minutes to one hour or more, and boron trihalide is recovered. The slag remaining following the reaction is composed primarily of borates and advantageously is treated with a dilute mineral acid, e. g. sulfuric or hydrochloric acid, to recover boric oxide which can be used again in the reaction.

My invention may be carried out in any suitable apparatus, such as a vertical furnace, inclined kiln or crucibles or retorts. A furnace or kiln preferably is used for continuous operation. In the reaction two immiscible liquids are present and in a continuous operation the alkali halide layer may be used as part of the feed for later charges. Also, contacting the molten reactants in a cascade type apparatus or by mechanical stirring increases yields due to mixing of the layers.

The yields of boron trihalide vary approximately linearly with the boric oxide content of the mixture. The yields of boron trihalide are functions of the alkali metal rather than the halogen used. This is indicated by the essentially equal yields for the different halides of the same alkali metal. There is a slight trend of increased boron halide yields according to the alkali metal, i. e. in the order of lithium, sodium and potassium. This independence of the halogen may indicate that the yield limiting indications are those of the slag product formed which consists largely of borates. Although I do not intend to limit my invention to a theoretical explanation, it appears that the yields are primarily limited by the fluidity of the melt. Thus, the higher the boric oxide content the more fluid the melt.

The process of my invention will be further illustrated by the following examples.

In the examples, mixtures of boric oxide and alkali metal or alkaline earth metal halides were heated to 800 to 1000° C. for one hour and the yield of boron trihalide determined by the loss in weight of the mixture. The loss in weight data were corrected for initial volatiles loss and a volatilization loss in determining the yields.

The alkali metal salts were mortar ground, then evacuated in a high vacuum train and heated over a period of two or three hours to 250°–300° C. This procedure of drying the salts was used to minimize the reaction of water vapor with the boron trihalides evolved in the reaction. The boric oxide was held under vacuum but was not heated to completely dry it. Heating produced a serious agglomeration of hard lumps which then had to be reground.

Blank runs were made on all samples to determine the weight percent of foreign material volatile under the conditions of study. Likewise the volatility was determined for each sample. Thus, when heated initially for one hour a pure salt lost $(x+y)$ weight percent, and on reheating for a further hour $y$ weight percent, then $x$ was the weight percent of volatile material and $y$ was volatility of the salt itself, $y$ being a function of surface area exposed.

For each run described the salts were weighed and intimately mixed in a closed container. They were then transferred to sillimanite crucibles and heated in a crucible furnace for one hour. The loss in weight observed was corrected for the previously determined volatiles content and inherent salt volatility. This correction was always maximized rather than minimized. The residual loss in weight was attributed to boron trihalides and yields were calculated on that basis. One hour is an arbitrary time of heating. The reaction is complete in a much shorter time period.

The products were identified qualitatively in separate experiments, but using the same conditions. For example, $BF_3$ was identified by infrared absorption and by analysis of the evolved gas for boron and fluorine, $BCl_3$ was identified by analysis of evolved gas for boron and chlorine and $BI_3$ was identified by behavior while being evolved from the crucible furnace in quantitative loss in weight experiments. Hydrolysis of $BI_3$ vapor yields violet iodine fumes due to the instability of HI above about 400° C.

The data on the various runs are tabulated in the table below.

As an illustration of the method of determining yields, run No. 6 is described. 7.29 grams of boric oxide, $B_2O_3$, were heated at 900° C. with 2.71 grams of lithium fluoride, LiF, in a mole ratio of 1:1. The observed loss in weight was 1.49 grams, while the calculated loss in weight due to volatiles contained in LiF was 0.0008 gram and to those in $B_2O_3$ 0.195 gram, while the correction due to volatilization of LiF was 0.0077 gram and of $B_2O_3$ 0.0105 gram, a total calculated loss of 0.21. The corrected loss in weight due to $BF_3$ formation was 1.28 grams. The fluoride recovery as boron trifluoride, $BF_3$, was 54 percent.

| No. | Metal Halide, gr. | $B_2O_3$, gr. | Mole Ratio, $B_2O_3/MX$ | T, °C. | Boron Halide | Yield,[1] percent |
|---|---|---|---|---|---|---|
| 1 | NaF | | 3/1 | 900 | $BF_3$ | 60 |
| 2 | NaCl 0.67 | 2.26 | 2.8/1 | 900 | $BCl_3$ | 54 |
| 3 | NaCl 0.55 | 2.00 | 3/1 | 1,000 | $BCl_3$ | 60 |
| 4 | NaBr | | 2/1 | 900 | $BBr_3$ | 35 |
| 5 | NaI 1.64 | 2.36 | 3.1/1 | 800 | $BI_3$ | 47 |
| 6 | LiF 2.71 | 7.29 | 1/1 | 900 | $BF_3$ | 54 |
| 7 | LiF | | 3/1 | 900 | $BF_3$ | 88 |
| 8 | KF | | 3/1 | 900 | $BF_3$ | 40 |
| 9 | KCl | | 2/1 | 900 | $BCl_3$ | 35 |
| 10 | KBr 2.64 | 2.34 | 1.5/1 | 900 | $BBr_3$ | 41 |
| 11 | $MgF_2$ | | 3/1 | 900 | $BF_3$ | 5 |
| 12 | $CaF_2$ | | 3/1 | 900 | $BF_3$ | 20 |

[1] Halide recovery as $BX_3$.

I claim:
1. The process of producing boron halides which comprises heating a predried mixture of boric oxide and an alkali metal halide in a molar ratio of about 3.5–1:1 at a temperature of about 800 to 1000° C.
2. The process of claim 1 in which the alkali metal is lithium.
3. The process of claim 1 in which the alkali metal is sodium.
4. The process of claim 1 in which the alkali metal is potassium.

References Cited in the file of this patent

UNITED STATES PATENTS

| | | |
|---|---|---|
| 1,898,532 | Hardtmann et al. | Feb. 21, 1933 |
| 2,135,460 | Loder | Nov. 1, 1938 |
| 2,163,232 | Baldeschwieler | June 20, 1939 |